Figure 1:
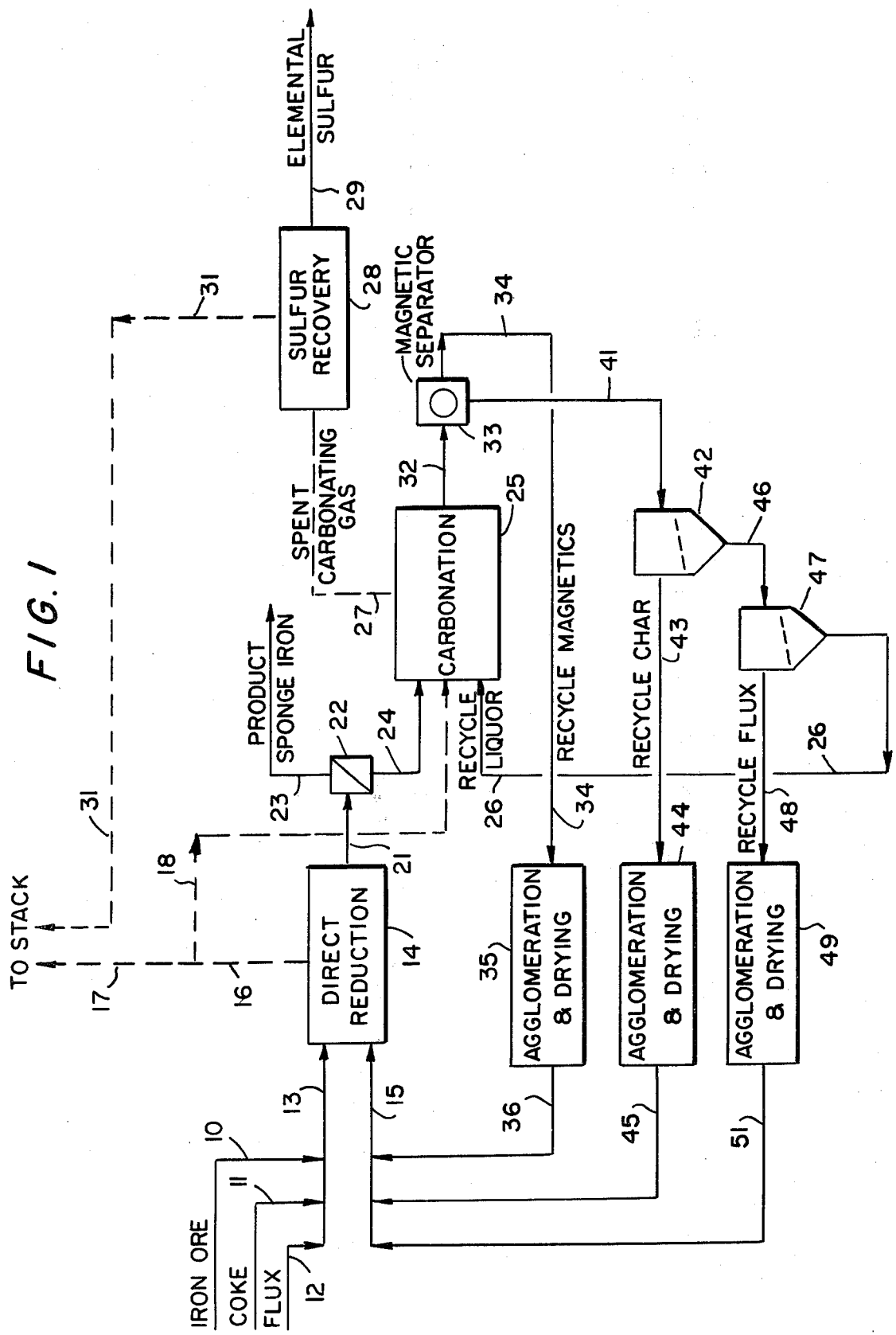

United States Patent [19]

Bauer

[11] 4,405,362

[45] Sep. 20, 1983

[54] IRON ORE DIRECT REDUCTION WASTE TREATMENT

[75] Inventor: William V. Bauer, New York, N.Y.

[73] Assignee: The Lummus Company, Del.

[21] Appl. No.: 402,716

[22] Filed: Jul. 28, 1982

[51] Int. Cl.³ ............................................ C21B 13/08
[52] U.S. Cl. .......................................... 75/24; 75/36
[58] Field of Search ................... 75/29, 33, 36, 37, 26, 75/24

[56] References Cited

U.S. PATENT DOCUMENTS 3,185,563  5/1965  Jones et al. ............................. 75/36

FOREIGN PATENT DOCUMENTS 930029  7/1963  United Kingdom ................... 75/33

Primary Examiner—M. J. Andrews
Attorney, Agent, or Firm—Elliot M. Olstein; Louis E. Marn

[57] ABSTRACT

In the direct reduction of iron ore, there is recovered a solid mixture of carbonaceous reductant and used flux, followed by dispersion of the mixture in an aqueous liquid and carbonation of the flux in the mixture in order to enable effective separation of the used flux from the carbonaceous reductant. After separation, the carbonaceous reductant is recycled to the reducing of iron ore.

12 Claims, 2 Drawing Figures

IRON ORE DIRECT REDUCTION WASTE TREATMENT

This invention relates to the reduction of iron ore, and more particularly to the treatment of iron free solids recovered from such reduction.

Direct reduction of iron ore to produce "sponge iron" is an important and growing method of producing iron suitable for conversion to steel.

One such methodology for direct reduction of iron ore involves the use of a reduction kiln into which there is introduced iron ore (lump or pelletized), a solid carbonaceous reductant and flux for binding with the sulfur in the kiln (generally as part of the carbonaceous reductant) to thereby prevent such sulfur from combining with the metallized iron. In general, such flux is comprised of calcium carbonate, generally in the form of limestone or dolomite.

In the reduction kiln, the feed is heated to reaction temperature and retained for a number of hours to achieve the desired reduction of the iron oxide in the ore to sponge iron. During the heating, the flux evolves carbon dioxide, and is converted to oxides, with the calcium oxide subsequently reacting with sulfur values ($H_2S$, COS) generated during reduction from the sulfur contained in the carbon source to form calcium sulfide. To achieve good reduction, a large amount of carbonaceous reductant is fed to the kiln, generally about three times the amount actually consumed, so that even at the discharge end of the kiln there is sufficient carbon to cover the kiln burden and prevent reoxidation of the iron sponge.

The kiln discharge is comprised of iron sponge product, excess carbonaceous reductant, generally as char, and spent flux. After cooling the solids, the solids are subjected to a screening operation in order to separately recover iron sponge product, carbonaceous reductant, and spent flux.

It is highly desirable to recycle much of the carbonaceous reductant included in the solid discharge from the kiln; however, as a result of particle size changes during reduction, there is always considerable cross-contamination between the carbonaceous reductant and the spent flux fraction. Accordingly, a large portion fo the carbonaceous reductant is included in the spent flux fraction, and is discarded from the process along with the spent flux.

The discarded spent flux also presents a disposal problem as a result of the sulfide content thereof. Such sulfide when exposed to rain water generates hydrogen sulfide by reacting with carbon dioxide or other acidic components dissolved in such rain water. Moreover, unconverted oxides in the spent flux give rise to excessive alkalinity in the leachate.

Various methods have been tried to improve waste solid separation into a carbonaceous reductant fraction that can be recycled, with minimum amounts thereof being lost in the spent flux fraction, including flotation, slaking etc. Slaking is beneficial in that it causes the spent flux to descrepitate facilitating separation of the spent flux from the carbonaceous reductant. However, the oxides in spent flux from a direct reduction operation do not slake readily because of changes brought about by the kiln reactions and the severity of the time-temperature treatment in the kiln. As a result, such methods have not been particularly effective in separating a spent flux fraction having a minimum quantity of carbonaceous reductant therein.

In accordance with the present invention, there is provided improved treatment of the solids recovered from the direct reduction of iron ore so as to enable separation of a spent flux fraction, and a carbonaceous reductant fraction, having a minimum amount of cross-contamination.

More particularly, the mixture of carbonaceous reductant and spent flux recovered from the direct reduction of iron ore is treated by carbonating the flux in the mixture (which mixture is dispersed in an aqueous liquid), and such carbonation achieves desired decrepitation of spent (used) flux, whereby such spent flux may be easily separated from the carbonaceous material. As a result, there can be recovered, as separate fractions, carbonaceous reductant, and spent flux having a minimum amount of cross-contamination.

The spent flux in the mixture may be carbonated by direct addition of carbon dioxide or by treatment with an aqueous solution of an alkali carbonate and/or bicarbonate, with such reactions being represented by the following equations, wherein M is an alkali metal:

$$CaO + CO_2 = CaCO_3 \qquad (1)$$

$$MgO + CO_2 = MgCO_3 \qquad (2)$$

$$CaO + M_2CO_3 + H_2O = CaCO_3 + 2MOH \qquad (3)$$

$$MgO + M_2CO_3 + H_2O = MgCO_3 + 2MOH \qquad (4)$$

$$CaO + MHCO_3 = CaCO_3 + MOH \qquad (5)$$

$$MgO + MHCO_3 = MgCO_3 + MOH \qquad (6)$$

In the above reactions, the reaction between magnesium oxide and alkali carbonate may proceed only to a limited extent.

Accordingly, the carbonation is best achieved by using direct treatment with gaseous carbon dioxide.

The spent flux in the mixture is treated with carbon dioxide or carbonate at conditions at which oxide of the flux can be converted to the corresponding carbonate. In general, the carbonation is accomplished at temperatures in the order of from room temperature up to the boiling temperature of the liquid at the prevailing pressure (generally atmospheric pressure).

Applicant has also found that in addition to achieving the desired decrepitation of spent flux, calcium sulfide in the spent flux, is also carbonated to produce calcium carbonate and hydrogen sulfide. Such carbonation of the sulfide is best accomplished by direct treatment with carbon dioxide in that when using alkali metal carbonates or bicarbonates, alkali sulfide by-product is formed, which is soluble in water, and which may be troublesome from the point of view of subsequent processing.

In carbonating calcium sulfide to calcium carbonate and hydrogen sulfide, sometime during the carbonation the pH should be below 10, and preferably below 8.5. In addition, in order to achieve a higher concentration of hydrogen sulfide in the effluent gas from the carbonation, the amount of carbonation gas should be controlled to achieve an acceptable reaction rate (generally in excess of stoichiometric proportions), while simultaneously preventing excessive dilution of hydrogen sulfide in the effluent gas.

The gas recovered from such carbonation will include some hydrogen sulfide and such gas may be treated in a sulfur recovery operation to recover sulfur values as elemental sulfur.

Alternatively, the hydrogen sulfide may be converted to sulfur dioxide, followed by scrubbing of sulfur dioxide with carbonated flux, as hereinafter described.

The mixture of carbonaceous reductant and carbonated spent flux, as a result of the decrepitation of the spent flux, may be easily treated to recover carbonaceous reductant, and flux, as separate fractions, with minimum cross-contamination, by wet screening, flotation, or other appropriate separation means. The carbonaceous reductant may then be recycled to the reduction of iron ore.

It is also possible, in some cases, to recycle carbonated flux to the iron reduction in that such carbonated flux includes calcium carbonate, which is the material used in the fresh flux for the reduction.

Although the preferred embodiment involves separation of carbonaceous reductant and flux, in some cases, it may be possible to recover a mixture of carbonaceous reductant and reconstituted flux and use such mixture (after treatment to obtain proper particle size) in the direct reduction.

In accordance with a further embodiment of the invention, an aqueous slurry of the carbonated flux may be employed for treating the off-gas from the iron reduction. A direct reduction operation generates appreciable levels of sulfur oxides, especially where a high sulfur reductant is employed. In order to meet requirements for release of oxides of sulfur into the atmosphere, in such cases, an aqueous slurry of the carbonated flux is employed for scrubbing the off-gas from the reduction operation.

More particularly, the aqueous slurry of carbonated flux, which includes calcium carbonate, is employed for direct contact with the off-gas from the direct reduction (a scrubbing operation) to remove sulfur oxide(s) from the gas. In such an operation, in the presence of oxygen, the sulfur values are recovered as calcium sulfate and carbon dioxide is released from the carbonate. The scrubbing operation may be operated at conditions generally employed in the art for removing sulfur dioxide from gases.

The off-gas from the scrubbing operation includes carbon dioxide, and all or a portion thereof may be employed to provide carbon dioxide requirements for carbonation of the spent flux.

Similarly, the off-gas from the direct reduction of iron ore also includes carbon dioxide, and all or a portion of such gas may be employed to provide carbon dioxide requirements for carbonation of the spent flux.

Figure 2:
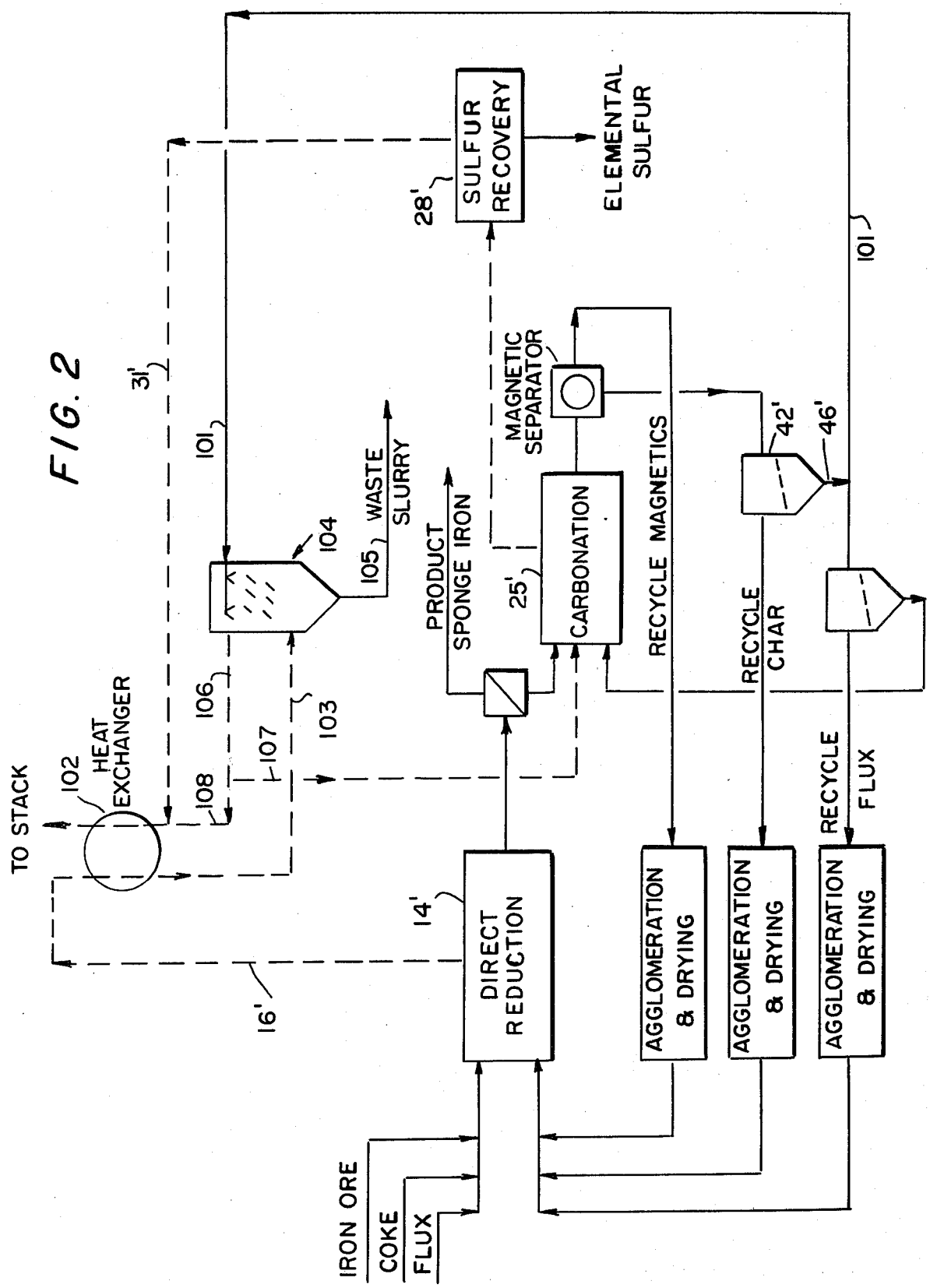

The invention will be further described with respect to the following drawings, wherein:

FIG. 1 is a simplified schematic flow diagram of an embodiment of the present invention; and FIG. 2 is a simplified schematic flow diagram of another embodiment of the present invention.

It is to be understood, however, that the scope of the invention is not to be limited to the embodiments illustrated in the drawings.

Referring now to FIG. 1 of the drawings, iron ore in line 10, carbonaceous reductant, in the form of coke, in line 11, and flux, which includes calcium carbonate, in line 12, are introduced through line 13 into a direct reduction zone, schematically generally indicated as 14, for directly reducing the iron ore to produce "sponge iron". The direct reduction zone 14 generally includes a suitable rotary kiln, and is operated at conditions known in the art for effecting direct reduction or iron ore to sponge iron. Thus, for example, the reduction may be accomplished at a temperature in order of from 1600° F. to 2100° F.

In addition, the direct reduction zone 14 is provided with recycle magnetics, carbonaceous reductant and reconstituted flux, in line 15, and obtained as hereinafter described.

In the direct reduction zone 14, the iron ore is converted to sponge iron, and the oxide is converted to calcium sulfide.

An off-gas, which includes carbon dioxide released from the flux, is withdrawn from the direct reduction zone 14 through line 16, and as particularly shown, a portion thereof is vented through line 17, and a further portion thereof is used in line 18 for carbonation of the flux, as hereinafter described.

A solid mixture, including sponge iron, spent flux, which is comprised of calcium oxide, as well as calcium sulfide (and which may further include magnesium oxide if the flux is provided as dolomite), the unused carbonaceous reductant, generally in the form of char, is withdrawn from direct reduction zone 14 through line 21 for introduction into a suitable separation device, schematically generally indicated as 22 for separating sponge iron from the remainder of the solids. Thus, for example, separation zone 22 may be a screening operation in order to separate the large sponge iron particles from the unused carbonaceous reductant and spent flux. Such sponge iron product is recovered through line 23.

The undersized product mixture comprised of spent flux, unused carbonaceous reductant, as well as some iron material may be withdrawn from separator 22 through line 24 for introduction into a carbonation zone, schematically generally indicated as 25.

The carbonation zone 25 is also provided with carbon dioxide containing gas, through line 18, and recycle aqueous liquor through line 26.

The carbonation zone 25 is operated as hereinabove described in order to carbonate the spent flux in the solid mixture (which solid mixture is present as an aqueous slurry) by direct treatment with carbon dioxide. In general, the carbonation zone is comprised of a suitable gas-liquid contacting device.

As hereinabove described, the carbonation results in decrepitation of the spent flux by converting calcium oxide (and magnesium oxide, if present) to the carbonate. In addition, calcium sulfide present in the spent flux is also converted to the carbonate, with such conversion generating gaseous hydrogen sulfide.

Spent carbonating gas, which includes hydrogen sulfide, is withdrawn from carbonation zone 25 through line 27, and introduced into a sulfur recovery zone, schematically generally indicated as 28 to convert hydrogen sulfide to elemental sulfide, for example, by the Stretford process, or if the concentration of hydrogen sulfide is high enough by the Claus process.

Elemental sulfur is recovered through line 29, and gases are recovered from recovery zone 28 through line 31 for suitable release.

The mixture of carbonaceous reductant and carbonated flux is withdrawn from carbonation zone 25 through line 32 and introduced into a recovery zone 33 for recovering any remaining iron material in the mixture. The recovery zone 33 may be a magnetic separator of a type known in the art, with recycle magnetics being recovered through line 34 for introduction into an agglomeration and drying zone, schematically generally indicated as 35 for subsequent recycle of the magnetic materials through lines 36 and 15 to the direct reduction zone 14.

A mixture of carbonaceous reductant and carbonated flux is withdrawn from separating zone 33 through line 41 for introduction into a separation zone, generally indicated as 42 for separating carbonaceous reductant from carbonated flux. As hereinabove noted, as a result of carbonation of the flux, such flux has a particle size smaller than the particle size of the carbonaceous reductant, which enables effective separation of the flux from the carbonaceous reductant in separation zone 42. Zone 42 may be, for example, a wet screening or flotation operation, of a type known in the art, whereby carbonaceous reductant is recovered through line 43. Such carbonaceous reductant in line 43 may then be agglomerated and dried in zone 44 to achieve a particle size useful for subsequent recycle to the direct reduction zone 14 through lines 45 and 15.

Carbonated flux and liquor are withdrawn from zone 42 through line 46 for introduction into a separation zone 47, e.g., a filtration zone, for separating the carbonated flux from an aqueous recycle liquor. Aqueous recycle liquor is recovered from zone 47 through line 26 for use in the carbonation zone 25.

Recycle flux is withdrawn from zone 47 through line 48, agglomerated and dried in zone 49 to achieve a particle size useful for subsequent recycle to the direct reduction zone 14 through lines 51 and 15.

Although the embodiment has been described with reference to recycle of the carbonated flux, in some cases, all or a portion of such flux may be discarded. The carbonated flux has the requisite stability for discarding thereof.

A further embodiment of the present invention is illustrated in FIG. 2, and in accordance with such embodiment, the off-gas from the direct reduction zone is treated to remove any sulfur oxides which may be present therein. In describing the embodiment of FIG. 2, portions of such embodiment which are similar to the embodiment of FIG. 1 are described with like prime numerals.

In accordance with the embodiment of FIG. 2, a portion of the aqueous slurry of carbonated spent flux recovered from separation zone 42' is employed in line 101 for treating off-gas from the direct reduction zone 14'.

Thus, as particularly shown, off-gas from the direct reduction zone 14' in line 16' is cooled in heat exchanger 102 by indirect heat exchange with vent gas, and the cooled gas in line 103 introduced into a scrubbing zone schematically generally indicated as 104 wherein the gas is contacted with the aqueous slurry which includes calcium carbonate introduced through line 101.

As a result of such contact, calcium carbonate in the slurry reacts with sulfur dioxide, in the presence of oxygen to produce calcium sulfate and carbon dioxide. Magnesium carbonate, if present, is also capable of reacting with sulfur dioxide in a similar manner. A waste slurry including calcium sulfate is withdrawn from zone 104 through line 105.

The scrubbed gas withdrawn from zone 104 through line 106 includes carbon dioxide, and a portion of the gas in line 106 is introduced into the carbonation zone 25' through line 107 to provide carbon dioxide requirements therefor. The remainder of the gas in line 108 is combined with off-gas from sulfur recovery zone 28' in line 31' and the combined gas passed through heat exchanger 102 before being released into the atmosphere.

Thus, in accordance with the embodiment of FIG. 2, a portion of the flux, which is generated in carbonation zone 25' may be employed for removing sulfur oxide(s) from the off-gas from the direct reduction zone 14'.

In accordance with a modification of the embodiment of FIG. 2, the spent carbonating gas from zone 25' may be roasted to convert hydrogen sulfide to sulfur dioxide, and the gas containing sulfur dioxide introduced into scrubber 104.

The present invention will be further described with respect to the following examples, however, the scope of the invention is not to be limited thereby:

EXAMPLE 1

The following is a comparison between the use of the present invention, which includes carbonation of the spent flux, with the prior art procedure wherein spent flux is separated from carbonaceous reductant in order to enable recycle from the carbonaceous reductant. The comparison is based on a facility producing 76,500 lbs/hours of iron sponge.

TABLE I

Comparative Results
Basis: 250,000 MT/Y (76,500 L6/H) Iron Sponge Production

| Reduction Process | Base Case | With Carbonation |
|---|---|---|
| Flows, Lb/Hr: | | |
| coke | 53,251 | 24,803 |
| recycle char | 31,234 | 57,134 |
| char in re-cycle flux | | 933 |
| Flux CaCO$_3$ | 14,000 | 2,979 |
| Recycle: | | |
| CaCO$_3$ | — | 9,920 |
| CaO | 2,090 ⎫ with recycle char | 618 |
| CaS | 2,016 ⎭ | 129 |

| Char & Flux Streams | | From Red"n | Waste | Recycle Char | From Reduction | Total | To Scrubber and Waste | AFTER CARBONATION Recycle Char | Recycle Flux |
|---|---|---|---|---|---|---|---|---|---|
| Char | | 58,300 | 27,066 | 31,234 | 58,300 | 58,300 | 233 | 57,134 | 933 |
| Spent Flux | CaO | 8,364 | 6,272 | 2,092 | 6,272 | 772 | 154 | | 618 |
| | CaS | 4,032 | 2,016 | 2,016 | 2,016 | 161 | 32 | | 129 |
| | CaCO$_3$ | | | | | | | | 9,918 |
| | | 70,696 | 35,354 | 35,354 | 66,588 | 71,630 | 2,898 | 57,134 | 11,498 |

TABLE I-continued

Comparative Results
Basis: 250,000 MT/Y (76,500 L6/H) Iron Sponge Production

| Ratios | | |
|---|---|---|
| Coke Lb/Lb Iron | .6955 | .324 |
| CaCO$_3$ Lb/Lb Iron | .183 | .0389 |
| Solid Waste Lb/Lb Iron | .4575 | .0379 |
| Sulfur Lb/Lb Iron | | .0108 |
| Ratio to Base Case | | |
| Coke Usage | | 46.6% |
| CaCO$_3$ Usage | | 21.3% |
| Waste Solids | | 8.3% |

The present invention is particularly advantageous in that it enables effective separation of the carbonaceous reductant from the solid mixture withdrawn from the direct reduction furnace whereby there is a higher recovery of such carbonaceous reductant thereby reducing the net carbon requirements to the process. Moreover, the carbonated flux is stable and, therefore, suitable for disposal, or in some cases for reuse in the direct reduction operation.

Applicant has found that carbonation of the flux in the mixture of flux and carbonaceous reductant, as an aqueous slurry, results in effective carbonation of the flux at acceptable reaction rates.

These and other advantages should be apparent to those skilled in the art from the teachings herein.

Numerous modifications and variations to the present invention are possible in light of the above features and, therefore, within the scope of the appended claims, the invention may be practiced otherwise than particularly described.

What is claimed is:

1. In a process for reducing iron ore in the presence of a carbonaceous reductant and flux wherein there is recovered from the reducing, reduced iron, carbonaceous reductant, and used flux containing calcium oxide, the improvement comprising:
    separating reduced iron, as product, from a mixture of carbonaceous reductant and used flux;
    carbonating the used flux in said separated mixture as a slurry in an aqueous liquid to decrepitate the used flux and facilitate separation of used flux from carbonaceous reductant
    separating the carbonaceous reductant from the carbonated used flux; and
    reusing separated carbonaceous reductant as at least a portion of the carbonaceous reductant in reducing the iron ore.

2. The process of claim 1 wherein the flux is carbonated by direct contact between a gas containing carbon dioxide and the aqueous slurry of the mixture.

3. The process of claim 2 wherein the used flux includes calcium sulfide and the direct contact converts calcium oxide and calcium sulfide to calcium carbonate.

4. The process of claim 3 wherein at least a portion of separated carbonated flux is reused in the reduction of iron ore.

5. The process of claim 3 wherein the gas containing carbon dioxide is derived from an off-gas from the reducing.

6. The process of claim 1 wherein the carbonating is effected with an aqueous solutiion of at least one of alkali carbonate and bicarbonate.

7. The process of claim 3 wherein during at least a portion of the carbonation the pH of the aqueous slurry is below 10.

8. The process of claim 1 wherein off-gas containing sulfur oxide is recovered from the reducing, and further comprising:
    employing separated carbonated flux as an aqueous slurry, for scrubbing the off-gas from the reducing to remove sulfur oxides.

9. The process of claim 8 wherein the flux is carbonated by direct contact between a gas containing carbon dioxide and the aqueous slurry of the mixture.

10. The process of claim 9 wherein the used flux includes calcium sulfide and the direct contact converts calcium oxide and calcium sulfide to calcium carbonate.

11. The process of claim 10 wherein the gas containing carbon dioxide is derived from scrubbed off-gas.

12. The process of claim 10 wherein hydrogen sulfide is produced in the carbonating of flux and further comprising converting the hydrogen sulfide to sulfur dioxide, and scrubbing the sulfur dioxide with the aqueous slurry of carbonated flux.

* * * * *